United States Patent
Huber

[15] 3,705,757
[45] Dec. 12, 1972

[54] REAR PROJECTION SCREEN
[72] Inventor: Douglas B. Huber, Cincinnati, Ohio
[73] Assignee: Polacoat, Inc., Cincinnati, Ohio
[22] Filed: April 5, 1971
[21] Appl. No.: 131,110

[52] U.S. Cl. ................... 350/126, 161/3.5, 350/127
[51] Int. Cl. ............................................. G03b 21/60
[58] Field of Search...... 350/117, 123, 126, 127, 128, 350/320, 162 R; 161/3.5

[56] References Cited

UNITED STATES PATENTS

| | | | |
|---|---|---|---|
| 2,370,263 | 2/1945 | Schweizer | 161/3.5 |
| 1,969,475 | 8/1934 | Toeger | 161/3.5 |
| 3,523,717 | 8/1970 | Glenn | 350/128 X |

*Primary Examiner*—Samuel S. Matthews
*Assistant Examiner*—Richard L. Moses
*Attorney*—Melville, Strasser, Foster & Hoffman

[57] ABSTRACT

A rear projection screen which is essentially free from scintillation, said screen being composed of two essentially parallel screen surfaces lying in closely spaced apart relation, one of said surfaces comprising a refraction lens system composed of lens defining transparent articles contained in a plastic carrier coating, the other surface of said screen comprising either a second refractive lens system or a light transmissive matte surface which acts as a refractive system, said systems each acting to disperse light passing therethrough at different wave lengths to individually produce scintillation effects, said two systems jointly acting to counterbalance their respective scintillation effects to provide a screen which is essentially free from scintillation.

10 Claims, 4 Drawing Figures

PATENTED DEC 12 1972

3,705,757

INVENTOR/S

DOUGLAS B. HUBER

BY Melville, Strasser, Foster and Hoffman
ATTORNEYS

REAR PROJECTION SCREEN

BACKGROUND OF THE INVENTION

This invention relates to rear projection screens of the type which may be used to project images from photographic films in lighted rooms. Such rear projection screens in current use normally consist of a transparent support, such as a sheet of glass or plastic material, coated on one surface with a plastic film containing a myriad of minute transparent particles which acts to disperse the transmitted light. Such screen must have a high gain, i.e., sufficient brightness for the image projected on the screen to be readily viewed, and at the same time it must have sufficient resolution so that the projected image will be clear and sharply defined. While a surface composed of transparent particles, such as calcium carbonate, having a particle size greater than about 5 microns and normally less than about 40 microns in one dimension, produces an excellent screen surface, the lens particles act to break-up the light into colors of the spectrum, i.e., different colors are dispersed at different angles from each lens, resulting in a sparkle appearance which is called scintillation. The scintillation effect is not normally visible unless the observer is within ten feet or so from the screen, and even at relatively close distances the scintillation effect is not normally objectionable unless viewed constantly. The scintillation effect is, however, quite objectionable where continuous viewing is required at relatively close distances, as would be encountered in using a microfilm reader or a microscope projection viewer.

To date there has been no satisfactory way of overcoming the scintillation effect in rear projection screens so as to permit a viewer to use such screens at close range without eye fatigue and the unpleasant and disturbing visual sensations which result from the continuous viewing of the screen. Tinting of the screen surface or the use of filters do not effectively solve the problem in that such expedients reduce the gain and resolution of the screen in an undesirable manner.

RESUME OF THE INVENTION

In accordance with the present invention it has been found that the scintillation effect produced in conventional rear projection screens can be effectively overcome by utilizing two screen surfaces lying in closely spaced apart relation to each other, one such surface acting to counterbalance or offset the scintillation effect of the other. At least one of the surfaces comprises a refractive lens system composed of a myriad of minute transparent particles dispersed in a plastic carrier coating, essentially as in a conventional rear projection screen except that the quantity of lens particles is reduced. The remaining screen surface may comprise a second refractive lens system, again with the lens particles in reduced quantity, or in the alternative, the remaining screen surface may comprise a matte surface which also acts as a refractive system to disperse light passing therethrough. By matte surface is meant a surface which is dulled, as by being dull rubbed, etched, or coated to produce a surface which, while essentially uniform in texture, is nonetheless sufficiently irregular to disperse transmitted light. Matte surfaces as such, either alone or in combination, lack sufficient gain and resolution to provide a satisfactory rear projection screen; yet a matte surface can be successfully employed in a two-surface system wherein the other surface comprises a refractive lens system.

The spacing between the two refractive systems is critical depending upon the relative refractive indices of the systems, the substance occupying the space between the two systems, and in the case of a refractive lens system, the carrier coating in which the lens particles are dispersed. Generally speaking, the spacing between the screen surfaces will vary from about 0.010 inch to about 0.125 inch, the spacing being chosen to provide optimum counterbalancing of scintillation effects while maintaining good resolution and gain. Normally, the spacing will decrease as the refractive index of the lens defining particles increases relative to the refractive index of the carrier coating. The refractive index of the substance separating the two-screen surfaces must also be taken into consideration in determining screen surface separation. Where the separating substance is a plastic or glass sheet having a higher refractive index than air, as where the opposite surfaces of a transparent sheet are coated to define the screen surfaces, the spacing will be greater than when the spacing substance is air, as where two relatively thin sheets are each coated on one side and the coated surfaces are spaced apart by an interposed spacing mask.

Where both screen surfaces comprise refractive lens systems, it has been found desirable to reduce the total number of lens particles in the two-screen surfaces to slightly less than the number normally used for a single screen to obtain substantially the same light distribution characteristics. Similar considerations apply where one of the refractive surfaces comprises a matte surface, that is, the number of lens particles in the refractive lens system will be reduced to the extent required to balance the gain of the combination, i.e., the refractive lens system and the matte surface will produce substantially the same light distribution characteristics as a conventional single screen.

DESCRIPTION OF THE PREFERRED EMBODIMENT

Figure 1:
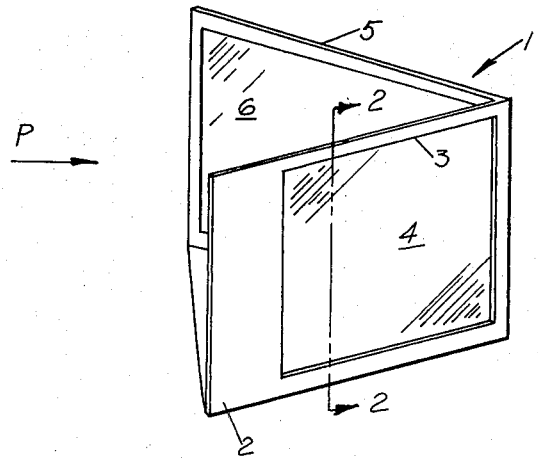
FIG. 1 is a perspective view of a simple rear vision screen assembly.

Referring first to FIG. 1 of the drawings, a simple rear projection screen assembly is indicated generally at 1, the assembly comprising a frame 2 having an opening 3 therein mounting a screen 4. An angularly related panel 5 mounts a mirror 6 positioned to reflect an image projected from a source indicated by the arrow P onto the screen 4. Such rear projection screen assemblies are well-known in the art and may take diverse forms, and it is to be understood that the nature of the screen assembly does not constitute a limitation on the present invention which is directed to the construction of the screen 4 as such.

Figure 2:
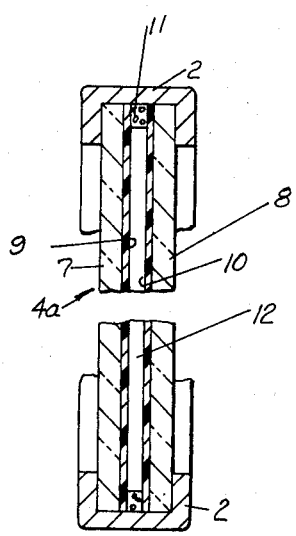
FIG. 2 is a vertical sectional view taken along the line 2—2 illustrating a dual screen in accordance with the invention wherein the screen surfaces are separated by a mask.

Referring next to FIG. 2, a screen construction 4a is illustrated wherein a dual screen in accordance with the invention is made up of transparent sheets 7 and 8, which may comprise clear glass or plastic, the facing surfaces of which are coated with thin layers 9 and 10, respectively, of a plastic carrier containing the dispersed lens defining particles which make up the refractive lens systems. The layers 9 and 10 are spaced apart by a peripheral mask 11 of the desired thickness, thereby providing an air space 12 between the screen surfaces.

The coated sheets 7 and 8 may be secured together in any desired manner. For example, the mask 11 may be coated on both sides with an adhesive which will adhere to the coatings on the sheets, or the mask may be formed from a heat sealable plastic material compatible with the plastic carrier layers 9 and 10. Alternatively, the marginal edges of the screen assembly may be covered by a tape capable of being adhered to the assembly, and to this end the frame 2 may be composed of strips of tape binding the edges of the screen and acting to define the opening 3. Other forms of screen holders may also be employed, including metal or plastic frame members which are U-shaped in cross-section.

Figure 3:
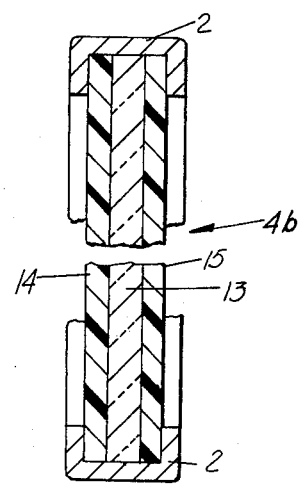
FIG. 3 is a vertical sectional view similar to FIG. 2 illustrating an alternative construction wherein the screen surfaces are formed on opposite sides of a clear sheet.

In the embodiment illustrated in FIG. 3, the dual screen 4b is composed of a transparent sheet 13 of the required thickness, the opposite surfaces of the sheet being coated with thin layers 14 and 15 of a plastic carrier substance containing the lens forming particles. In this instance, the screen surfaces, as defined by the layers 14 and 15, are spaced apart by the required distance by means of the transparent sheet 13. As before, the dual screen so-formed may be mounted or secured to a frame 2 in any desired manner. The transparent sheets 7 and 8, or 13, may comprise optically clear glass or an optically clear plastic material, such as clear polyvinyl chloride, cellulose acetate, or a clear acrylic resin, such as methylmethacrylate resin.

The particle carrying layers 7, 8, and 14, 15 may comprise various plastic materials applied in the form of liquid coatings, including materials such as R.S. nitrocellulose, acrylic dispersions and emulsions, polyvinylidene chloride, polyvinyl chloride — polyvinyl acetate copolymer solutions, styrenemaleic anhydride copolymer solutions, and latex systems. The carrier layers may be applied in any suitable manner, as by spraying or other conventional coating techniques, the carrier layers each having a thickness of preferably about 0.0025 — 0.005 inch.

It will be understood, however, that the carrier layers as applied to their supporting surfaces will contain the lens defining particles which will have a particle size in the range of 5 to about 40 microns in diameter, the particles being non-achromatic. Suitable lens forming particles may comprise calcium carbonate, gypsum, Barium Crown glass, micro beads, magnesium carbonate, or transparent particles of resin, such as styrene. The quantity of lens defining particles incorporated in the carrier vehicle will be from about 10 to about 30 percent by weight of the weight of the carrier, which is generally slightly less than about half the number of particles conventionally used for a single screen to obtain comparable light distribution characteristics.

The spacing between the screen surfaces will vary depending upon the refractive index of the carrier layer as compared with the refractive index of the lens forming particles, and also depending upon the substance separating the screen surfaces, i.e., whether it is air or a transparent sheet. By way of example, if the spacing substance between the screen surfaces is air and the plastic carrier coatings have a refractive index of 1.49 and the lens defining particles a refractive index of 1.54, the minimum spacing for the two screen surfaces is about 0.030 inch. If lens forming particles having a higher refractive index are used, such as a 1.60 refractive index, then the minimum spacing should be reduced, preferably to about 0.015 inch. Conversely, if the lens particles are of low refractive index, such as 1.43, then the spacing between the screen surfaces should be increased to about 0.040 inch. Where the spacing substance between the two screen surfaces is a transparent sheet having a higher refractive index than air, a minimum spacing of about 0.040 inch is preferred, although the spacing will vary depending upon the relative refractive indices of the carrier layers, the lens forming particles, and the substance separating the lens surfaces. Generally speaking, as the spacing is increased the resolution of the image projected on the screens will be impaired, whereas if the spacing is decreased, the "scintillation" effect begins to appear. While spacing up to about 0.125 inch can be tolerated under certain circumstances, the loss of resolution tends to impair good viewing.

Figure 4:
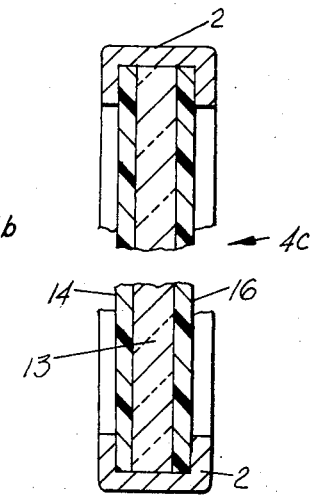
FIG. 4 is a fragmentary vertical sectional view similar to FIG. 3 illustrating a screen having a matte surface.

In the embodiment of the invention illustrated in FIG. 4, the dual screen 4c is provided with a frame 2 mounting a transparent sheet 13 of the required thickness, one surface of the sheet being coated with a thin layer 14 of a plastic carrier substance containing lens forming particles. In this instance, the opposite surface of the sheet 13 comprises a matte surface 16, and such surface may be on either the viewing or the projector side of the screen. The sheet 13, which may be either glass or plastic, may be either etched, rubbed or coated in conventional fashion to produce the desired matte surface, as will be understood by the worker in the art. The matte surface preferably will be what is known as a medium matte having from about 75 percent to about 80 percent light transmission. The key consideration is to pair the diffusing media in the carrier layer 14 with the matte surface 16 to the degree necessary to effectively overcome scintillation while retaining good resolution. Where the sheet is glass, the matte finish will be a true matte and not the so-called non-glare finish.

As in the case of the embodiment of FIG. 3, the spacing between the screen surfaces 13 and 16 shown in FIG. 4 will vary. For example, if the lens forming particles having a refractive index of 1.43 and their plastic carrier a refractive index of 1.51, the surfaces should have a minimum spacing of about 0.050 inch. Lens forming particles of 1.57 refractive index and a plastic carrier of 1.63 refractive index would have a minimum spacing of about 0.015 inch. Any variation in the total gain of the two systems will necessitate a like change in minimum spacing. A total gain of 200 or below will require a reduction in spacing by about 0.005 inch, which will achieve nonscintillation with better resolution. Conversely, a total gain of 750 would necessitate a spacing thickness of 0.050 inch up to 0.125 inch, the degree of non-scintillation with regard to loss of resolution being the determining factor in the screen design.

If desired, a color or pigment may be added to any of the screens, in which event the spacing of the screen surfaces becomes relative to the degree of over-all screen transmission. When the light transmission approaches 70 percent, the spacing should be increased by as much as 0.005 inch. Conversely, when the over-all light transmission is below 40 percent, the spacing should be reduced by 0.005 inch. Generally speaking, the amount of color added is less of a determining factor than the refractive index of the lens particles. The colors used may be insoluble pigment and dyes which will produce the desired tint.

Representative examples of non-scintillating dual screens in which the screen surfaces are separated by air, as illustrated in FIG. 2, are as follows:

Example I

A coating of a water emulsion of an acrylic resin containing 10 parts by weight of transparent particles of styrene resin having particle sizes between 5 and 40 microns in diameter was applied to one surface of a pair of transparent sheets of ⅛ inch thick optically clear glass and dried, the coatings each having a thickness of 0.0025 inch. The coated surfaces of the two sheets were juxtaposed and spaced apart by a mask having a thickness of 0.015 inch.

Example II

An air spaced dual screen was prepared as in Example I, except that the carrier coating applied to the sheets comprised a polyvinyl chloride — polyvinyl acetate copolymer solution containing 20 percent by weight Barium Crown glass particles having a particle size of 10 to 25 microns, the thickness of each coating being 0.0035 inch.

Example III

An air spaced screen was prepared as in Example I, but with the sheet surfaces coated with a styrene-maleic anhydride copolymer solution containing 20 percent by weight of micro beads having a particle size of 20-25 microns, the coating layers each having a thickness of 0.0035 inch.

Example IV

Two sheets of 0.030 inch thick polyvinyl chloride were each coated on one surface with a latex system containing 20 percent by weight of magnesium carbonate with a particle size of 5-10 microns, the coating layers having a thickness of 0.004 inch. The dried coated surfaces were juxtaposed and spaced apart around their edges by a mask of a transparent plastic film having a thickness of 0.015 inch.

Examples of dual screens constructed in accordance with the embodiment illustrated in FIG. 3, wherein the substance separating the screen surfaces is a sheet of transparent material, are as follows:

Example V

A 0.030 inch thick sheet of polyvinyl chloride transparent plastic was coated on both sides with a 0.004 inch thick film of R.S. nitrocellulose containing 20 percent by weight of calcium carbonate transparent particles having an average particle size of 25 microns. The coating was applied from a solution of methyl ethyl ketone and alcohol by being sprayed on the supporting sheet and the coating permitted to dry.

Example VI

A sheet of 0.030 inch thick acrylic plastic was coated on both sides with a water dispersion of an acrylic resin containing 20 percent by weight of calcium carbonate transparent particles having a particle size of 5-10 microns, the coating being applied in a thickness of about 0.005 inch by means of an applicator roll.

Example VII

A piece of 0.030 inch glass was coated on both sides with a solution of polyvinylidene chloride containing 15 percent by weight of gypsum having a particle size of 10-20 microns, the coating thickness being 0.004 inch.

Representative examples of screens constructed in accordance with the embodiment illustrated in FIG. 4 embodying a matte surface are as follows:

Example VIII

A sheet of cellulose acetate having a thickness of 0.030 inch and a medium matte finish on one surface (75 percent light transmission) was coated on its opposite surface with a 0.004 inch thick coating of an acrylic — polyvinyl chloride solution containing 30 percent by weight calcium carbonate transparent particles having a particle size of 15-20 microns.

Example IX

A sheet of Mylar having a thickness of 0.030 inch and an etched matte finish on one surface (approximately 80 percent light transmission) was coated on its opposite surface with a 0.003 inch thick coating of a polyvinyl acetate — maleic anhydride copolymer solution, containing 30 percent Barium Crown glass particles having a particle size of 5-25 microns.

Example X

A sheet of optically clear glass having a thickness of 0.030 and an etched matte finish on one surface (about 80 percent light transmission) was coated on its opposite surface with the particle containing carrier layer described in Example IX.

From the foregoing it should now be evident that the instant invention provides screens which are essentially free from scintillation effects by utilizing a pair of closely spaced apart refractive surfaces at least one of which is composed of a carrier layer containing lens particles and the other either a layer of lens containing particles or a matte surface. The lens containing refractive systems will have a refractive index between about 1.43 and about 1.60, with the spacing between the refractive surfaces varying from 0.010 inch to 0.125 inch in inverse relation to the refractive index of the lens containing system. Where one of the refractive systems is a matte surface, it will have 75 – 80 percent light transmission and will be paired with a lens containing refractive system so as to provide the desired light scattering properties. Generally speaking, where one of the refractive systems is a matte surface, the resultant screen will be of relatively high gain, usually in the range of 500–700, although the gain may be modified by the addition of a tint.

Modifications may be made in the invention without departing from its spirit and purpose. Numerous such modifications have already been set forth and others will undoubtedly occur to the skilled worker in the art when reading this specification.

The embodiments of the invention in which an exclusive property or privilege is claimed are defined as follows:

1. A rear projection screen comprising a pair of essentially parallel light transmissive screen surfaces lying in closely spaced apart relation, each of said surfaces comprising a refractive system acting to disperse light passing therethrough at different wave lengths and individually acting to produce scintillation effects, said two systems jointly acting to counterbalance their respective scintillation effects to provide a screen which is essentially free from scintillation, at least one of said refractive systems comprises a plastic carrier layer containing lens defining particles, said system having a refractive index of from about 1.43 to about 1.60.

2. The screen claimed in claim 1 wherein both of said refractive systems comprise plastic carrier layers containing lens defining particles.

3. The screen claimed in claim 2 wherein said refractive systems are spaced apart by a distance of from about .015 to about .125 inch, the distance decreasing as the refractive index of the systems increases.

4. The screen claimed in claim 3 wherein said refractive systems are formed on the opposite surfaces of a transparent sheet which serves as a spacer for the refractive systems.

5. The screen claimed in claim 3 wherein said refractive systems are each formed on a separate transparent sheet which are juxtaposed with the refractive systems facing each other and the sheets spaced apart by an interposed mask.

6. The screen claimed in claim 1 wherein the other of said refractive systems comprises a matte surface having from about 75 to 80 percent light transmission.

7. The screen claimed in claim 6 wherein said refractive systems are spaced apart by a distance of from about 0.010 to about 0.125 inch, the distance decreasing as the refractive index of the system containing the lens defining particles increases.

8. The screen claimed in claim 7 wherein said refractive systems are formed on the opposite surfaces of a transparent sheet which serves as a spacer for the said systems.

9. A rear projection screen comprising an opposing pair of essentially parallel light transmissive screen surfaces spaced apart by a distance of from about 0.015 inch to about 0.125 inch, each of said screen surfaces comprising a refractive system composed of a plastic carrier layer having a thickness of from about 0.0025 to about 0.005 inch and containing lens defining particles having a particle size of from about 5 to about 40 microns, said systems having a refractive index of from about 1.43 to about 1.60, the spacing between said systems varying inversely with their refractive index.

10. A rear projection screen comprising a transparent opposing pair of essentially parallel light transmissive screen surfaces spaced apart by a distance of from about 0.010 inch to about 0.125 inch, one of said screen surfaces comprising a refractive system composed of a plastic carrier layer having a thickness of from about 0.0025 to about 0.005 inch and containing lens defining particles having a particle size of from about 5 to about 40 microns, said system having a refractive index of from about 1.43 to about 1.60, the other of said systems comprising a matte surface having from about 75 percent to about 80 percent light transmission, the spacing between sand systems as determined by the thickness of said transparent sheet varying inversely with the refractive index of said first named refractive system.

* * * * *